United States Patent [19]

Simonetti

[11] Patent Number: 4,713,198

[45] Date of Patent: * Dec. 15, 1987

[54] HIGH TEMPERATURE PLASTIC SCINTILLATORS

[75] Inventor: John J. Simonetti, Cranbury, N.J.

[73] Assignee: Sangamo Weston, Inc., Norcross, Ga.

[*] Notice: The portion of the term of this patent subsequent to Mar. 25, 2003 has been disclaimed.

[21] Appl. No.: 722,204

[22] Filed: Apr. 11, 1985

Related U.S. Application Data

[63] Continuation-in-part of Ser. No. 604,699, Apr. 27, 1984, Pat. No. 4,578,213.

[51] Int. Cl.$^4$ .............................................. C09K 11/06
[52] U.S. Cl. ............................ 252/301.17; 250/361 R
[58] Field of Search ................................... 252/301.17

[56] References Cited

U.S. PATENT DOCUMENTS

| | | | |
|---|---|---|---|
| 3,011,978 | 12/1961 | Gosnell et al. | 252/301.3 |
| 3,567,925 | 3/1971 | Muga et al. | 250/71.5 |
| 3,791,983 | 2/1974 | Maierson | 252/305 |
| 3,886,082 | 5/1975 | Hyman, Jr. | 252/301.2 R |
| 3,950,646 | 4/1976 | Whitlock | 250/361 |
| 4,180,479 | 12/1979 | Siegrist et al. | 252/301.24 |
| 4,495,084 | 1/1985 | Shimizu et al. | 252/301.17 |
| 4,578,213 | 3/1986 | Simonetti | 252/301.17 |

FOREIGN PATENT DOCUMENTS

| | | |
|---|---|---|
| 2614519 | 10/1977 | Fed. Rep. of Germany . |
| 1128140 | 9/1968 | United Kingdom . |
| 1480953 | 7/1977 | United Kingdom . |

OTHER PUBLICATIONS

Dyer, Encyc. Polym. Sci. and Techn., vol. 9, Interscience, N.Y., N.Y., pp. 450–459.
Franks et al., IEEE Trans. on Nuclear Science, vol. NS-25, No. 3, Jun. 1978.
Mitchell et al, "High Pressure Studies of Fluorenone Emission in Plastic Media", Jour. Chem. Phy., vol. 67, No. 11, (Dec. 1977).
Birks Scintillation Counters, McGraw-Hill Book Co.; N.Y., N.Y.; 1953, pp. 102–105.

*Primary Examiner*—Arthur P. Demers
*Attorney, Agent, or Firm*—Dale Gaudier

[57] ABSTRACT

A plastic scintillator comprises a polymethylpentene thermoplastic material containing a fluorescent additive. This plastic scintillator material functions at high temperatures with excellent optical properties in the detection of neutrons. The plastic scintillator may also include an energy transfer compound, a wavelength shifter, a solubility enhancer for the polymethylpentene and a decolorizing agent.

10 Claims, No Drawings

HIGH TEMPERATURE PLASTIC SCINTILLATORS

CROSS REFERENCE TO RELATED APPLICATIONS

This application is a continuation-in-part of Ser. No. 604,699, filed Apr. 27, 1984, now U.S. Pat. No. 4,578,213.

FIELD OF THE INVENTION

This invention relates to new plastic scintillators, and more particularly to novel plastic scintillators which will function at temperatures to 200° C. and higher with exceptional optical properties and stability.

BACKGROUND OF THE INVENTION

Scintillation materials are used in the detection and measurement of radiation. Scintillators are composed of substances which are capable of absorbing energy given off by the fission fragments emitted by radioactive elements. The absorbed energy excites fluorescent materials contained in the scintillator, so that the fluorescent materials give off light. Such scintillators are useful in many different applications, e.g., the detection of radioactive mineral deposits, and the detection and measurement of radioactive contamination.

Plastics are often used as such scintillation materials. The plastic materials that have found the widest application consist of those manufactured from thermosetting plastics. These thermosetting plastics include polystyrene, polyvinyl toluene, and various acrylic polymers. The acrylic polymers are primarily employed for their cost effectiveness in fabrication of large volume scintillators.

The generation of light from these plastics is accomplished through the addition of small amounts of many different combinations of organic molecules known to have fluorescent properties of high efficiency. These molecules include p-terphenyl and naphthalene.

Hyman, Jr. U.S. Pat. No. 3,886,082, issued May 27, 1975, discloses an example of one such plastic scintillator material. The scintillator disclosed in the Hyman patent employs acrylic polymers and copolymers as the host plastic and bis-(o-methyl styryl)benzene, perylene, tetraphenylbutadiene, diphenylanthracene, bis(-phenyloxazolyl benzene), and dimethyl bis(phenyloxazolyl benzene) as the fluorescent additive.

Siegrist et al., U.S. Pat. No. 4,180,479, issued Dec. 25, 1979, discloses the use of various stilbene derivatives as fluorescent agents in scintillators.

U.S. Pat. No. 4,495,084 to Shimizu et al discloses plastic scintillators in which a scintillating substance is incorporated into a matrix resin which comprises a copolymer of a styrene type compound and various unsaturated copolymers including unsaturated esters.

U.S. Pat. No. 3,010,908 to Broderick et al also discloses fluorescent plastic scintillators which are based on styrene type polymers.

U.S. Pat. No. 3,068,178 is concerned with liquid scintillators for fluorescence. In column 5, plastic scintillators are discussed, including those based on polystyrene and polyvinyltoluene.

In U.S. Pat. No. 3,600,445 to Wirth et al there are disclosed organic scintillators such as para-terphenyl, 2,5-diphenyloxazol (PPO), and 2,5-bis-[5'-tertiarybutyl-benzoxazolyl-(2')]-thiophen.

In U.S. Pat. No. 2,745,967 to Ludeman, radiation conductors are disclosed which include polystyrene and polymerized methylmethacrylate.

In a publication by Birks in "Scintillation Counters", McGraw Hill Book Company, New York, NY, 1953, pages 102-105, there is a discussion regarding the scintillation properties of anthracene and stilbene when dissolved in polystyrene, Lucite, and Parplex, which are all transparent plastics. Organic solutions of phosphors are also disclosed.

In a publication in The Journal of Chemical Physics, Vol. 67, No. 11, Dec. 1, 1977 by Mitchell et al, there are disclosed high pressure studies of fluorenone emission in plastic media. In this article, fluorenone flourescence was studied, and in the experimental section, the study was carried out by pressing pellets of polymethylpentene between hot plates to make films approximately 0.2 millimeters thick. The films were then soaked in a hexane solution of fluorenone and dried and washed with methanol to provide samples of the fluorenone. A similar study was carried out with polyisobutylene. The luminescence was then studied using these structures. However, this is not use of the polymethylpentene as the host plastic in a plastic scintillator.

The prior art scintillators have the major disadvantage that none of the host polymers have been found suitable for use at temperatures up to and above 200° C. For example, the maximum temperature of non-cross linked polyvinyl toluene is 75° C.; and that of cross-linked polyvinyltoluene is 100° C. The prior art polymers with the highest temperature resistance are the acrylic co-polymers, with a maximum temperature of 150° C.

SUMMARY OF THE INVENTION

It is therefore an object of this invention to provide a new scintillator host plastic material which will function at high temperatures with exceptional optical properties.

It is a further object of this invention to provide a scintillator composition comprising a host plastic containing a primary fluorescent additive, and, optionally, containing other additives.

A still further object of the invention is to provide a scintillator composition based on the novel scintillator host plastic material which will function at high temperatures, the scintillator comprising polymethylpentene, a primary fluorescent agent, and optionally an energy transfer compound, a wavelength shifter, a solubility enhancer and/or a decolorizing agent.

Still further objects of this invention are to provide a method of producing said scintillator compositions and their use in the detection and measurement of radioactive materials.

This invention relates to the use of polymethylpentene as a scintillator host plastic material, to provide plastic scintillators which will function at high temperatures. Primary, and optionally, secondary agents, are added to the host plastic such as an energy transfer compounds, wavelength shifters, solubility enhancers, and decolorizing agents.

This invention also relates to a method for producing the plastic scintillator composition, which comprises melting the polymethylpentene in an evacuated chamber, adding and mixing the fluorescent agents and any other additives while the composition is maintained at a temperature above the melting point, and cooling the composition.

DESCRIPTION OF THE PREFERRED EMBODIMENTS

As indicated above, this invention relates to scintillators and methods of detecting radiation with the scintillators and methods of detecting radiation with the scintillators, either from mineral deposits or in the measurement of radioactive contamination. According to the present invention, it has been found that a modified polymethylpentene finds particular advantage as a plastic scintillator because the material has excellent high-temperature resistance and excellent optical properties. In particular, it has been found that the modified polymethylpentene has the capacity to withstand operations at temperatures as high as 200° C. and higher without visible distortion. In addition, this modified plastic material is very transparent in the ultraviolet range and maintains a 90 percent transmission at 350 nm.

Polymethylpentene is a known thermoplastic material and is available commercially. For example, polymethylpentene in the form of pellets is available from the Mitsui Chemical Company of Japan. The polymethylpentene provides special advantages in use as a scintillating plastic material. Its unique properties permit its use at higher temperatures in the detection of neutron radiation fluxes than known previously in the prior art, the polymethylpentene thermoplastic having a melting point of 235° C.

For use in the present invention, the polymethylpentene is modified in order to provide the special advantages of the present invention. According to a main embodiment of the present invention, the polymethylpentene resin pellets are initially melted and then cast into shape by a refreezing process. During the melting operation, however, or while the thermoplastic material is in melted form, there is added thereto small amounts of different combinations of organic materials which have fluorescent properties of high efficiency and other desired additives. This is necessary since the polymer per se does not possess these characteristics. Thus fluorescent organic compounds are added to the melt in order to convert the incoming radiation to light which can be detected by a photomultiplier tube when used as a scintillator.

In the method for forming the product of the invention, the resin pellets of the polymethylpentene are subjected to an elevated temperature to melt the pellets and form a plastic melt. Suitable apparatus, such as the use of a glass manifold and a mechanical vacuum pump, can be used for this operation as described in the examples set forth below. It is preferred that the temperature of the polymethylpentene pellets be raised to the range of 250° C. to 350° C. and maintained at this temperature to provide time for addition of the fluorescent agents and other additives as necessary. The melting operation is carried out at a temperature high enough to purify the thermoplastic by evolving or driving off materials such as antioxidants which have been added to stabilize the plastic material.

After the melt is obtained in accordance with the above procedure, it is then in condition for addition of fluorescent dyes as necessary. Preferably, the fluorescent dyes are added while the melt is maintained at temperatures in the range of about 250° C. to 320° C. with the melt temperature being determined by the physical properties of the compound to be added to the melt. In one aspect of the invention, one or more aromatic compounds are added as a primary fluorescent agent to convert the polymethylpentene into a material which will transfer energy and cause the polymethylpentene to have the capacity to emit light. Aromatic compounds which meet this criteria include about 1 to 15 weight percent of a material such as naphthalene, p-terphenyl, or mixtures thereof. When the fluorescent compounds are added, suitable mixing should be achieved in order to assure a homogeneous distribution of the components. It has been found experimentally that anthracene present in concentrations of about 0.01 weight percent gives the best results.

In a preferred formulation for the invention, there will be included in addition to the primary fluorescing agent, other additives, sometimes referred to as secondary fluorescent agents. The secondary fluorescent agents are sometimes also described as energy transfer agents and wave shifters. Energy transfer compounds cause energy from the primary fluorescing agent to be re-radiated at a lower wavelength. A "wavelength shifter" is a compound which will absorb energy from the energy transfer compound and re-radiate it at a higher wavelength. Compounds useful as energy transfer compounds and "wavelength shifters" include anthracene and anthracene derivatives, oxazole and oxazole derivatives, oxadiazole, styryl, and stilbene compounds.

In a still further embodiment of the invention, because the polymethylpentene has poor solubility for some additives, it is preferred to also include a solubility enhancer as an additional additive. In addition, since the polymethylpentene has a natural yellow haze or color, it is preferable to include a decolorizing agent to improve transparency of the scintillator.

The energy transfer compound which causes energy from the primary fluorescing agent, such as naphthalene, to be re-radiated at a lower wavelength is preferably a compound such as butyl-PBD which is butyl-2-phenyl-5-(-4-biphenylyl)-1,3,4-oxadiazole or butyl PPO which is 2,5-diphenyloxazol. The energy transfer compound is preferably present in an amount of about 0.001 to 0.1 wt. %.

The "wavelength shifter" is an additive which has been found useful in absorbing energy from the energy transfer compound and re-radiating it at a higher wave length, i.e., at wavelengths ranging from 400-450 nm for the most preferred compound. The wavelength shifter is preferably a compound such as para-bis(O-methyl styryl)benzene or POPOP which is (p-bis[-(5-phenyl-oxazolyl)]benzene. This compound is preferably present in an amount of about 0.001 to 1 wt. % for best results.

To cause the polymethylpentene to be more receptive as the host material in dissolving the various additives, it has been discovered that the solvating power of the polymethylpentene can be enhanced by the addition of solvent enhancer compounds. This has been found particularly necessary for addition of materials such as the energy transfer compounds and the wavelength shifter discussed above. Two compounds were found to be particularly useful as solubility enhancers. These compounds are dodecyl benzene and dodecyl alcohol which are high boiling point liquids which can be added to the melted polymethylpentene host material after vacuum degassing has been completed. Both of these compounds are used to gain a range of enhanced solubility for different compounds at the same time. With the aid of these solubility enhancers, a new more efficient plastic scintillator is produced that will function unprotected for short periods of time at temperatures as high as 200° C. The solubility enhancers are preferably added in amounts of about 1–10 wt. %, preferably about 2–5 wt. %. It was noted particularly that the energy transfer compound, butyl-PBD, showed no solubility at all in the polymethylpentene in the absence of dodecyl alcohol addition. Similarly, the addition of dodecyl benzene permitted the content of naphthalene as a primary fluorescing agent to be increased over that which could be added to the untreated polymethylpentene host material. The ability to add higher amounts of napthalene or other primary fluorescing agents is beneficial in improving scintillator light output.

It has also been found that materials can be added to the polymethylpentene to remove the natural yellow tint of this resin. It has been discovered that a solution of sodium borohydride in dodecyl alcohol at 80° C. is a particularly preferred material which will decolorize the polymethylpentene. It is desirable that the polymethylpentene host be transparent and colorless as possible for maximum performance. The amount of the colorizing agent to be added is preferably in the range of 0.001 to 2 wt. %.

After the completion of the addition of fluorescent agents and other additives, the melt is then cooled, preferably by a slow cooling procedure, to lower the temperature to below 200° C., where the scintillator hardens into the desired shape.

The resulting plastic scintillator will be found to have undergone both optical and nuclear spectroscopic changes. Thus, the plastic scintillator now possesses the necessary properties to withstand unsupported operation to 200° C. and higher with no visible distortion. An optical spectroscopic study of this polymethylpentene material as a function of temperature shows no deterioration in fluorescent light output when cycled consecutively through 75° C., 150° C., and 200° C. for 1 hour each, after which the material is returned to room temperature. Further, ultraviolet excited fluorescent spectroscopy at temperature indicates that, unlike conventional plastic scintillator systems, the formulation actually increases in overall light output. The measured increase is a function of the exact composition but has been as large as a factor of 2 at 200° C., compared to total light output at room temperature. The most striking advantages of the scintillator of the present invention are the high temperature resistance and the high hydrogen concentration, as compared to the best obtainable commercial plastic scintillators. A high hydrogen content is essential for scintillators to be used in neutron detection.

The present invention is illustrated in the following examples, where parts are by weight unless otherwise indicated. However, the invention is not to be considered as limited thereto.

EXAMPLE I

The polymethylpentene scintillator composition is made and cast to shape by a simple melting and refreezing process. In this procedure, a glass manifold and oil filled mechanical vacuum pump, and an external source of heat are used. The glass manifold consists of a nitrogen inlet vacuum valve, an outlet valve, and a liquid nitrogen cooled vacuum trap between the sample vial attachment port and the oil filled vacuum pump. A simple mechanical vacuum gauge is fitted between the vacuum pump and glass manifold pump-out port to monitor vacuum conditions. The resin vial consists of an 8" long, 32 mm diameter Pyrex tube with a flat bottom. This vial is necked into a ½" Pyrex tube. Before this vial is used, it is scrubbed thoroughly with detergent and rinsed with deionized water. The vial is then dried by washing with reagent grade propanol and heating in an oven. The dried vial is then Silanized with a xylene solution of 5% dichlorosilane. The 8" long section of vial is filled with polymethylpentene resin pellets to a height of 12.5 cm. The resin pellets used were the RT 18 formulation of TPX, obtained from the Mitsui Chemical Company of Japan.

A vacuum of greater than 28" of mercury is established in the cleaned glass manifold after the resin vial has been filled and sealed onto its evacuation port. The temperature of the vial and resin is then raised to 275° C. and maintained at this temperature for three hours. The vial transition tube is heated to 275° C. This allows any high boiling antioxidant addition to the resin to be removed. The antioxidant material condenses on the cooler part of the glass manifold, away from the resin vial. The vacuum melting of the polymethylpentene is accompanied by considerable bubbling of the liquid resin. Incomplete outgassing will result in a frozen melt of cloudy appearance. After three hours of vacuum melting, the glass manifold is backfilled with boil-off nitrogen gas. An exhaust port is then opened and the nitrogen gas is allowed to flow through the manifold during the mixing and freezing process. This procedure produces a purified polymethylpentene melt.

EXAMPLE II

The polymethylpentene melt produced by the process disclosed in Example I is maintained at a temperature of 250° C. to 320° C. for the addition of various fluorescent compounds. The melt temperature is determined by the physical properties of these compounds. At this point 1–10 wt % of PPO is added slowly to the melt, followed by an oxazole derivative as a wavelength shifter. Addition of all solutes is accomplished through an introduction port directly above the vial containing the polymethylpentene melt. The flowing nitrogen prevents the influx of air from the port, while the fluorescent compounds are being added. Immediately after addition of the fluorescent compounds, the melt is mixed with a stainless steel rod for fifteen minutes. This assures a homogeneous distribution of components.

Mixing is followed by a relatively rapid cooling cycle to freeze the melt. Although rapid, uncontrolled freezing can produce scintillator material, it should be noted that a much slower or directionally controlled freezing yields material of higher homogeneity. Such controlled freezing is accomplished by the use of a programmable, ramped temperature lowering system. The directional freezing is accomplished by slow lowering of the melt out of the oven hot zone and into a cooler oven zone which is maintained at a temperature of 200° C. or lower. The product is an improved scintillation material suitable for use at temperatures up to and above 200° C.

EXAMPLE III

The new scintillator composition was tested against prior art commercial scintillators for density, concentration of hydrogen atoms per cc, and maximum temperature. BC 438 is obtained from Bicron Corporation, Scintiplex III from National Diagnostics, and NE 102 from Nuclear Enterprises. The results follow in Table I.

TABLE I

| Designation | Host Polymer | Density | H Atoms/cc | H Atoms/gram | T Max |
|---|---|---|---|---|---|
| BC438 | PVT (cross linked) | 1.054 g/cc | $4.86 \times 10^{22}$ | $4.61 \times 10^{22}$ | 100° C. |
| Scintiplex III | Acrylic co-polymer | 1.18 g/cc | $5.3 \times 10^{22}$ | $4.49 \times 10^{22}$ | 150° C. |
| Product of Example II | PMP Modified | 0.83 g/cc | $8.3 \times 10^{22}$ | $10.0 \times 10^{22}$ | 200° C. |
| NE 102 | PVT | 1.032 g/cc | $5.3 \times 10^{22}$ | $5.1 \times 10^{22}$ | 75° C. |

EXAMPLE IV

The scintillator composition was tested against prior art commercial compositions for neutron scintillation behavior. The results follow in Table II.

TABLE II

| OPTICAL PROPERTIES | | | |
|---|---|---|---|
|  | Maximum Emission | $n_d$ | Intensity vs NE 102 |
| BC 438 | 425 nm | 1.58 | 136% |
| Scintiplex III | 435 nm | 1.49 | 82% |
| Product of Example II | 432 nm | 1.46 | 30% (at 20° C.) |
| NE 102 | 423 nm | 1.58 | 100% |

The unique low density of the polymethyl pentene host plastic permits the scintillator to be very insensitive to gamma or x-rays but very sensitive for neutron detection applications.

EXAMPLE V

Polymethyl pentene is useful as a plastic scintillator material not only for its high temperature resistance, but also for its high neutron sensitivity. Table III shows the results of testing of various characteristics of conventional plastic host materials, such as acrylics.

TABLE III

| | Density grams/cc | Refractive Index ($n_d$) | H Atoms/cc | Melting Temperature |
|---|---|---|---|---|
| Polymethylpentene | 0.83 | 1.46 | $8.3 \times 10^{22}$ | 235° C. |
| Conventional Acrylic Plastics | 1.18 | 1.49 | $5.3 \times 10^{22}$ | 75–200° C. |

As disclosed, polymethylpentene-based plastic scintillator materials are the only plastic scintillator materials capable of withstanding unsupported operation up to 200° C. with no visible distortion. A detailed optical spectroscopic study of this material as a function of temperature also shows no deterioration in fluorescent light output when cycled consecutively through 75° C., 150° C. and 200° C. for one hour each and then returned to room temperature. In addition, ultraviolet excited fluorescence spectroscopy at temperature indicates that unlike conventional plastic scintillator systems the formulation described here actually increases in overall light output. The measured increase is a function of the exact composition but has been as large as a factor of 2 at 200° C. compared to the total light output at room temperature.

EXAMPLE VI

This example illustrates the use of other additives in addition to the primary fluorescing agent for use as a scintillator.

The polymethylpentene resin is loaded into a suitable vial whose dimensions are governed by the final scintillator required. The vial is sealed onto a glass vacuum manifold capable of reaching a vacuum of at least 50 microns. The vacuum is generated by an oil sealed mechanical pump separated from the manifold by a liquid nitrogen cooled trap. The system is nitrogen flushed by pumping the air from the system and back filling with dry nitrogen from a source of liquid nitrogen boil-off gas. This is repeated three separate times. The vial is then slowly heated over a 30 minute ramp time to 275° C., the heating being accomplished under a vacuum of more than 100 microns of mercury. Once the resin has melted it is outgassed under vacuum for 2 hours.

A chemical purification decolorizing solution is then prepared in a septum sealed vial. This decolorizing solution comprises dodecyl alcohol saturated with sodium borohydride and maintained at 80° C. After the polymethylpentene melt has been degassed for 2 hours, the temperature is lowered to 265° C. and the manifold is again backfilled with nitrogen gas. Then 1 cc of the decolorizing solution per 50 ccs of melt is added by syringe through a septum injection port on the vacuum manifold. After this addition, the melt is stirred to distribute the added solution and stirring is continued for 1 hour.

The fluorescent components are then prepared in a solution of 1 cc of dodecyl benzene and 1 cc of dodecanol. Dissolution of the fluorescing components is promoted by heating to 50° C. The components to be added were naphthalene as the primary fluorescing agent, 1.5 grams, butyl-PBD, 0.1 grams per 40 grams of melt, as the energy transfer agent; and bis-MSB, 0.010 grams per 40 grams of polymethylpentene melt, as the wave shifter material. This solution was established in an anaerobic state under nitrogen in a septum sealed glass vial. The solution was then injected into the resin melt during continued stirring. Stirring at 265° C. is continued under flowing nitrogen for 1 hour to promote homogeneity of the fluorescent dyes throughout the resin melt. Stirring was terminated followed by an immediate moderately slow controlled cooling to maximize the transparency of the final cast ingot.

The resulting scintillator can operate at temperatures up to 200° C. and has a uniquely high selectivity for neutron detection in an energy dispersive mode.

The invention has been described herein with reference to certain preferred embodiments. However, as obvious variations thereon will become apparent to those skilled in the art, the invention is not to be considered as limited thereto.

What is claimed is:

1. As an article of manufacture, a plastic scintillator which will function at high temperatures and retain as optical properties, said scintillator comprising a polymethylpentene host plastic containing a fluorescent agent, an energy transfer compound to cause energy from the fluorescent agent to be re-radiated at a lower wavelength, a wavelength shifter to absorb energy from the energy transfer agent and re-radiate it at a higher wavelength, a solubility enhancer for the polymethylpentene, and a decolorizing agent.

2. An article of manufacture according to claim 1 wherein the energy transfer compound comprises an oxazole, an oxidiazole, a styryl or stilbene derivative or mixtures thereof.

3. An article according to claim 1 wherein the wavelength shifter comprises an oxazole, an oxadiazole, a styryl or stilbene derivative or mixtures thereof.

4. An article according to claim 1 wherein the solubility enhancer is selected from the group consisting of dodecyl benzene and dodecyl alcohol.

5. An article according to claim 1 wherein the decolorizing agent comprises sodium borohydride saturated in dodecyl alcohol.

6. As an article of manufacture, a plastic scintillator which will function at high temperatures and retain its optical properties, said scintillator comprising a polymethylpentene host plastic containing an aromatic hydrocarbon fluorescent agent selected from the group consisting of p-terphenyl and mixtures of p-terphenyl with a compound selected from napthalene, napthalene derivatives and mixtures thereof.

7. As an article of manufacture, a plastic scintillator which will function at high temperatures and retain its optical properties, said scintillator comprising a polymethylpentene host plastic, an aromatic hydrocarbon fluorescent agent and a solubility enhancer.

8. As an article of manufacture, a plastic scintillator which will function at high temperatures and retain its optical properties, said scintillator comprising a polymethylpentene host plastic, an aromatic hydrocarbon fluorescent agent, a solubility enhancer and a decolorizing agent.

9. An article according to claim 8 wherein the scintillator also includes a wavelength shifter.

10. An article according to claim 8 wherein the scintillator also includes an energy transfer compound.

* * * * *